United States Patent [19]

Rodkin et al.

[11] Patent Number: 4,462,765

[45] Date of Patent: Jul. 31, 1984

[54] LIQUID-PROOFING SYSTEM FOR AN ELECTRIC MOTOR OF A DEEP-WELL PUMPING UNIT

[76] Inventors: Valentin V. Rodkin, ulitsa Dubki, 4, kv. 108; Anatoly A. Chudinovsky, ulitsa Musy Dzhalilya, 14, korpus 1, kv. 159; Valentina V. Petrova, Chernomorsky bulvar, 7, korpus 2, kv. 81, all of, Moscow, U.S.S.R.

[21] Appl. No.: 327,457

[22] Filed: Dec. 4, 1981

[51] Int. Cl.³ .................... F04B 35/04; H02K 5/12
[52] U.S. Cl. ........................................ 417/414; 310/87
[58] Field of Search .................. 417/414, 422, 424; 310/87

[56] References Cited

U.S. PATENT DOCUMENTS

| | | | |
|---|---|---|---|
| Re. 26,783 | 2/1970 | Boyd . | |
| 1,970,484 | 8/1934 | Arutunoff | 310/87 |
| 2,001,649 | 5/1935 | Arutunoff . | |
| 2,569,741 | 10/1951 | Arutunoff . | |
| 2,674,702 | 4/1954 | Arutunoff . | |
| 2,703,371 | 3/1955 | Wightman . | |
| 2,783,400 | 2/1957 | Arutunoff | 310/87 |
| 3,182,214 | 5/1965 | Boyd | 310/87 |
| 3,475,634 | 10/1969 | Bogdanov et al. . | |
| 3,502,919 | 3/1970 | Boyd et al. . | |
| 3,571,636 | 3/1971 | Carle et al. . | |
| 3,671,786 | 6/1962 | Jones . | |
| 3,854,064 | 12/1974 | Dunbar | 310/87 |

Primary Examiner—Carlton R. Croyle
Assistant Examiner—Jeffrey A. Simenauer
Attorney, Agent, or Firm—Fleit, Jacobson, Cohn & Price

[57] ABSTRACT

A liquid-proofing system for an electric motor, having a casing divided by two partition walls into three coaxially arranged chambers—a top chamber, an intermediate chamber, and a bottom chamber. The partition walls have openings for establishing communication between chambers and for the passage of a shaft interconnecting the shafts of the electric motor and pump. The top chamber is filled with an intermediate liquid, and the lower and the intermediate chambers are filled with the same oil as the oil filling the electric motor. Seals are provided which are formed by rotary and stationary parts and secured to the shaft and partition walls, respectively. The top chamber and the intermediate chamber communicate through pipes directly with the lower part of the bottom chamber, and the seals are installed in the intermediate chamber, the lower part of the bottom chamber and the pipe connecting it to the top chamber being filled with the intermediate liquid.

2 Claims, 2 Drawing Figures

LIQUID-PROOFING SYSTEM FOR AN ELECTRIC MOTOR OF A DEEP-WELL PUMPING UNIT

The invention relates to deep-well pumps, and more specifically, to a liquid-proofing system of an electric motor in a deep-well pumping unit to be used for lifting fluid from a well, and the invention may be successfully used in the oil-recovery, ore mining, construction and other industries where fluid is to be lifted from wells.

A system for liquid-proofing an electric motor of a deep-well pump is designed for preventing well fluid from getting to the interior of the electric motor since penetration of well fluid to the electric motor lowers the strnegth of electrical insulation of the stator, impairs operation of the rotor bearings, thereby reducing the time of operation of the deep-well pumping unit in the well.

Known in the art are various systems for protecting the interior of the electric motor against the action of the well fluid (cf. U.S. Pat. No. 3,854,064 to Clarence Dunbar of Dec. 10, 1974). A deep-well pumping unit disclosed in the patent comprises a pump and an electric motor, and a liquid-proofing system of the electric motor provided between the motor and the pump.

The liquid-proofing system comprises an insulator and a protector. These two parts comprise three chambers disposed one above another and separated by transverse partition walls and by mechanical seals of a shaft extending therethrough, which are provided over the partition walls. The top chamber is defined within the insulator and is filled with an intermediate liquid which is heavier than oil in the electric motor and well fluid. The intermediate chamber and the bottom chamber are within the protector and filled with the same oil as the interior of the electric motor. A compartment in which is installed a thrust bearing is disposed between the intermediate and bottom chambers. The chambers are series connected to one another by means of pipes secured in the partition walls. As mentioned above, a shaft coupled to the electric motor shaft and to the pump shaft by means of spline couplings extends through the chambers of the liquid-proofing system. The above-mentioned seals of the system consist of two parts—a rotary part and a stationary part which are secured to the shaft and partition walls, respectively. As the seals are installed over the partition walls, one seal is located within the top chamber and the other seal is located under the intermediate chamber.

The above-described liquid-proofing system cannot ensure a prolonged operation of a deep-well unit in the well because of the following disadvantage. The mechanical seals let a small quantity of liquid, which is oil in this case, to pass between the movable and stationary sealing contact surfaces, the oil leakage being directed from the shaft toward the outer surface of the mechanical seal. Therefore, oil in the prior art system flows during operation of the electric motor through the mechanical seal from the lower chambers to the upper chambers, that is from the bottom chamber, through the compartment, to the intermediate chamber, and from the intermediate chamber to the top chamber. As the top chamber is filled with a heavier liquid having a greater specific gravity, or a greater density, oil ascends to the surface thereof to be mixed with the well fluid and to be irrecoverably lost. For that reason the period of operation of the unit in the well is limited by the stock of oil and intermediate liquid in the chambers to compensate for oil losses and to ensure the insulation of the mechanical seal from the action of the well fluid.

It is an object of the invention to provide a liquid-proofing system for an electric motor in a deep-well pumping unit, which makes it possible to prolong operation of the electric motor in the well by eliminating oil losses.

Another object of the invention is to improve the reliability of the pumping unit in operation as a whole and to reduce the number of lifting operations for overhaul of the pumping unit.

These and other objects are accomplished by that in a liquid-proofing system for an electric motor of a deep-well pumping unit, comprising a casing divided by means of three transverse partition walls, having openings for communication and for the passage of a shaft therethrough, into three coaxially arranged chambers disposed one over another—a top chamber, an intermediate chamber, and a bottom chamber, the top chamber being filled with an intermediate liquid, and the intermediate and bottom chambers being filled with the same oil as the electric motor, and mechanical seals each having a rotary part and a stationary part, according to the invention, both top and intermediate chambers communicate directly with the lower part of the bottom chamber through pipes, and the seals of both partition walls are installed in the intermediate chamber, the lower part of the bottom chamber and the pipe establishing its communication with the top chamber being filled with the intermediate liquid. The intermediate fluid may also be of any suitable type and should have a greater specific gravity or be heavier than the motor fluid, and be nonsoluble in the motor fluid, as discussed in U.S. Pat. No. 3,502,919.

The advantage of the liquid-proofing system for an electric motor of a deep-well pumping unit resides in that owing to the installation of both mechanical seals in the intermediate chamber and direct communication of the top and intermediate chambers with the lower part of the bottom chamber, natural leakages of the intermediate liquid from the top chamber and of oil from the bottom chamber through the mechanical seals are directed toward the intermediate chamber from which the leaking fluids are fed through the pipes back to the same chambers where they originated, whereby losses of both intermediate liquid and oil through the liquid-proofing system are eliminated, and the period of operation of the pumping unit is not limited by such losses.

The invention will now be described with reference to a specific not limiting embodiment of a liquid-proofing system for an electric motor of a deep-well pumping unit illustrated in the accompanying drawings, in which.

Figure 1:
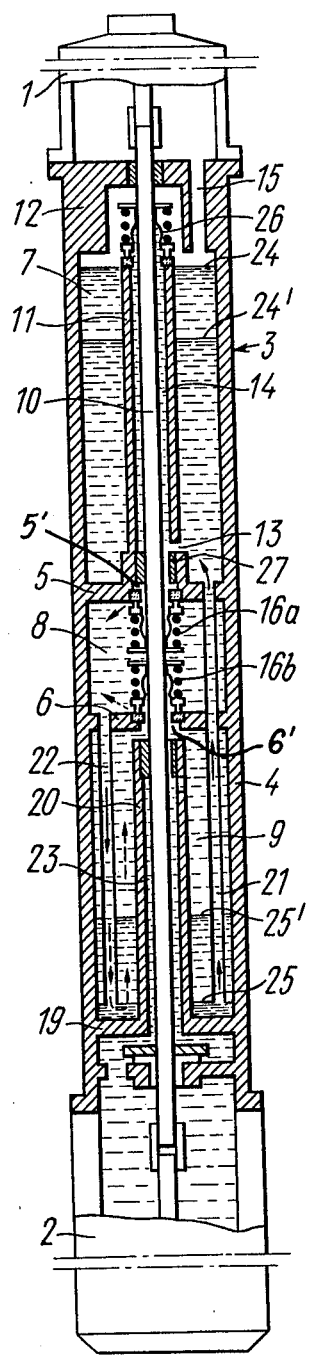
FIG. 1 shows a partial side elevation in section of a deep-well pumping unit with a liquid-proofing system of an electric motor.

A deep-well pumping unit shown in FIG. 1 comprises a pump 1 proper, an electric motor 2, and a liquid-proofing system for protecting the electric motor. The pump 1 and the electric motor are not described in detail since the pumping unit may have a conventional deep-well rotary impeller, screw or other pump and a deep-well electric motor of conventional type having the interior filled-up with a liquid dielectric material such as oil.

A liquid-proofing system according to the invention comprises a cylindrical casing 4 divided by partition walls 5 and 6 into three coaxially arranged chambers 7, 8, and 9-top, intermediate, and bottom chambers, respectively. A shaft 10 extends through these chambers and is coupled to the shaft of the pump 1 and to the shaft of the electric motor 2 by means of splined couplings.

The top chamber 7 is defined by the casing 4, a protective sleeve 11, a head 12, and the partition wall 5. The lower end of the protective sleeve 11 is secured in the partition wall 5. At least one opening 13 is made in the lower portion of the protective sleeve 11 for communication of an annular space of the sleeve with the shaft 10 and chamber 7. The head 12 has an opening 15 communicating the chamber 7 with the interior of the pump 1.

Figure 2:
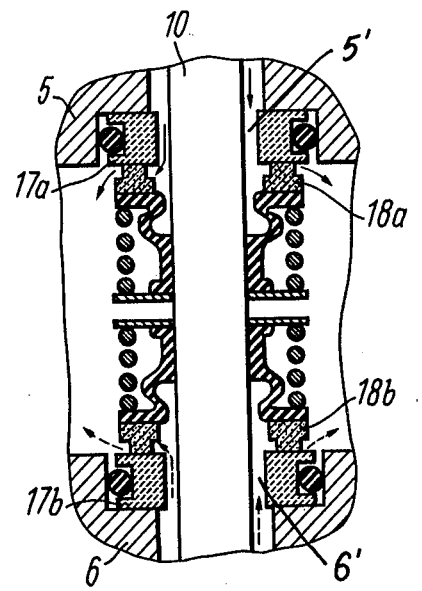
FIG. 2 is a detail of installation of mechanical seals in the intermediate chamber (enlarged view).

The intermediate chamber 8 is defined by the casing 4 and partition walls 5 and 6, for which purpose the partition walls 5 and 6 have openings 5' and 6', respectively, as illustrated in the drawing, and through which shaft 10 passes. As a result of this, the upper chamber 7, the intermediate chamber 8 and the bottom chamber 9 are arranged coaxially, as best seen in the drawing. Mechanical bellows-type seals 16a and 16b are installed in the chamber 8 (FIGS. 1,2), the stationary parts 17a and 17b (FIG. 2) being installed in the partition walls 5 and 6, respectively, and the rotary parts 18a and 18b being secured to the shaft 10.

The bottom chamber 9 is defined by the casing 4, partition walls 6 and 19, and a protective sleeve 20. The lower end of the sleeve 20 is secured in the partition wall 19 and the upper end thereof is installed in the upper part of the bottom chamber 9 adjacent to the partition wall 6.

The lower part of the top chamber 7 communicates with the lower part of the bottom chamber 9 by means of a pipe 21 having its upper end secured in the partition wall 5. The lower part of the intermediate chamber 8 communicates with the lower part of the bottom chamber 9 by means of a pipe 22 having its upper end secured in the partition wall 6.

The bottom chamber 9 communicates with the interior of the electric motor 2 through an annular passage 23 defined by the shaft 10 and the protective sleeve 20.

The intermediate and bottom chambers 8 and 9, the annular space 23, and the pipe 21 are filled with similar or the same oil such as a transformer oil as the interior of the electric motor 2.

The upper chamber 7 is filled to a level 24, and the annular space 14, the pipe 21, and the lower part of the chamber 9 to a level 25 at the lower edge of the pipe 21 are filled with an intermediate liquid which is heavier i.e., having a greater specific gravity or a greater density, than the oil in the electric motor and the well fluid and which is immiscible therewith.

The upper part of the top chamber 7 and the passage 15 are filled with the well fluid.

The annular space 14 is separated from the upper part of the chamber 7 and from the interior of the pump 1 by means of a mechanical seal 26 having its stationary part installed on the upper end of the protective sleeve 11 and a rotary part secured to the shaft 10.

The features of the operation of the liquid-proofing system will be discussed in detail below without describing operation of the whole deep-well pumping unit in full details as this is known to those skilled in the art.

Before lowering into the well, the intermediate chamber 8 and the bottom chamber 9 of the liquid-proofing system, and the pipe 22 are filled with oil, and the chamber 7 and the pipe 21 are filled with the intermediate liquid to the level 24. The same intermediate liquid is poured to fill the lower part of the bottom chamber 9 in which the boundary line 25 separating this liquid from oil is established at the level of the lower edge of the pipe 21.

After the deep-well pumping unit is lowered into the well and put in operation, oil in the electric motor is heated and expands. Excess oil flows through the annular space 23, chamber 9, and pipe 21 into the top chamber 7 to ascend above the level 24 of the intermediate liquid to be mixed with the well fluid.

After steady temperature conditions of the electric motor are established, the expansion of oil volume, hence oil escapement from the interior of the motor through the liquid-proofing system stops. The boundaries separating the liquid will remain at the levels 24 and 25 as shown in FIG. 1.

The mechanical seals 16a and 16b are installed in the intermediate chamber 8 in such a manner that natural leakage therethrough caused by centrifugal forces as a result of rotation of rotary parts of the seals is directed from the top chamber 7 through the seal 16a and from the bottom chamber 9 through the seal 16b to the intermediate chamber 8. At the same time, leakages in the opposite direction from the chamber 8 through the seals 16a and 16b into the chambers 7 and 9 are eliminated. By virtue of this, in operation of the deep-well pumping unit the intermediate liquid incoming in small quantities through the seal 16a from the chamber 7 through the opening 13 and passage 27 to the chamber 8 flows down through the pipe 22 to the lower part of the chamber 9. As the chamber 9 is completely filled-up with oil and intermediate liquid, the additional quantity of intermediate liquid admitted thereto will displace from the lower part of the chamber 9 the same quantity of the intermediate liquid present therein through the pipe 21 back to the top chamber 7.

In the same manner, oil leakage from the chamber 9 admitted to the chamber 8 through the seal 16b are returned back through the pipe 22 to the lower part of the chamber 9 to ascend above the level 25 of the heavier intermediate liquid.

Therefore, an organized circulation and return of natural leakages of intermediate liquid and the oil through mechanical seals 16a and 16b back to the same chambers where they originated are provided in the liquid-proofing system according to the invention. This facility eliminates losses of both oil and intermediate liquid from the electric motor and its liquid-proofing system.

The directions of circulation of the intermediate liquid and oil in the liquid-proofing system are shown by solid arrows for the intermediate liquid and dotted arrows for oil.

Boundaries between the liquids in the chambers 7 and 9 will remain at the levels 24 and 25 as shown in FIG. 1.

After the deep-well pumping unit is stopped the temperature of its various parts, including the electric motor and the liquid-proofing system, will drop to the ambient well fluid temperature. Upon cooling, the volume of oil in the electric motor and liquid-proofing system decreases. By virtue of this, the boundaries between oil and intermediate liquid and between the intermediate liquid and well fluid at the levels 25 and 24, respectively, are displaced, the first level upwards and the second level downwards under the action of the hydrostatic column of fluid in the well until temperatures of liquids outside and inside the electric motor and the liquid-proofing system become equal when the levels will be 25' and 24', respectively.

Upon putting the pumping unit in operation again its parts start heating, the volume of oil in the whole system increases, and the boundaries between the fluids start going in the opposite directions. In case the heating of the electric motor and liquid-proofing system is the same or higher after the re-insertion as upon the first starting, the boundaries between the fluids will be the same as before, that is 24 and 25. If the temperature is lower than that upon the first starting, new levels between the levels 25' and 24', respectively, may be established.

Further, upon starting and stopping the pumping unit, the above-described cycles of changes in the levels of boundaries between the fluids are repeated.

An additional mechanical end seal 26 installed in the chamber 7, which separates the annular space 14 from the chamber 7 prevents the well fluid from getting from the chamber 7 and from the interior of the pump to the annular space thus eliminating the possibility of disruption of operation of the mechanical seal 16a by the well fluid which can contain various impurities, including mechanical impurities.

The preferred embodiment of the invention has been described above, and it will be apparent to those skilled in the art that various modifications may be made therein without deviating from the spirit and scope of the invention.

We claim:

1. In a deep-well pumping unit having an electric motor filled with an oil to provide a liquid dielectric and a pump for pumping a well fluid and interconnected with the motor by a shaft, a liquid-proofing system for said electric motor, comprising: a casing, two transverse partition walls dividing said casing into three coaxially arranged chambers—a top chamber, an intermediate chamber, and a bottom chamber, said top chamber being filled with an intermediate liquid having a specific gravity which is greater than the specific gravity of an oil filling the electric motor and the specific gravity of the well fluid, said intermediate liquid being immiscible with the oil and well fluid, said intermediate chamber being filled with an oil having a specific gravity corresponding to the specific gravity of the oil filling the electric motor, and said bottom chamber being filled with substantially the same oil as the oil in the intermediate chamber, and only a lower part of the bottom chamber being filled with the same intermediate liquid as the top chamber, openings provided in said two partition walls for the passage of said shaft interconnecting said electric motor and said pump, a first pipe for establishing communication between the intermediate chamber and a lower part of the bottom chamber, said first pipe being filled with the same oil as the intermediate chamber, a second pipe for establishing communication between the top chamber and the lower part of the bottom chamber, said second pipe being filled with the intermediate liquid, seals installed in the intermediate chamber and each having a rotary part and a stationary part, said seals being designed for sealing portions where the shaft passes through the partition wall separating the intermediate chamber and the top chamber and the partition wall separating the intermediate chamber and the bottom chamber, the rotary parts of said seals being installed on the shaft and the stationary parts being installed in the partition walls.

2. A deep-well pumping unit according to claim 1, wherein said liquid-proofing system includes a protective sleeve for the shaft and arranged in the upper chamber around the shaft and spaced therefrom, the sleeve having an opening disposed in its lower portion to provide communication with the upper mechanical seal in the intermediate chamber, the upper portion of said sleeve being sealed along the shaft by an individual mechanical seal.

* * * * *